United States Patent

Myron

Patent Number: 5,401,043
Date of Patent: Mar. 28, 1995

[54] COLLAPSIBLE CART

[76] Inventor: Gordon D. Myron, 7854 Eads, La Jolla, Calif. 92037

[21] Appl. No.: 140,513

[22] Filed: Oct. 25, 1993

[51] Int. Cl.⁶ .............................................. B62B 1/12
[52] U.S. Cl. ..................................... 280/42; 280/652; 280/47.24
[58] Field of Search ................... 280/638, 639, 38, 39, 280/40, 641, 645, 42, 651, 652, 47.131, 47.17, 47.24, 47.27, 47.35, 814

[56] References Cited

U.S. PATENT DOCUMENTS

| | | | |
|---|---|---|---|
| 2,755,096 | 7/1956 | Fishalow | 280/652 |
| 2,812,950 | 11/1957 | Holloway | 280/42 |
| 3,007,710 | 11/1961 | Sykes | 280/42 |
| 4,037,858 | 7/1977 | Adams | 280/652 |
| 4,062,565 | 12/1977 | Holtz | 280/655 |
| 4,299,403 | 11/1981 | Brewer et al. | 280/47.29 |
| 4,478,429 | 10/1984 | Adams | 280/655 |
| 4,684,414 | 8/1987 | Nanofawa | 280/42 |
| 4,915,408 | 4/1990 | Clemence et al. | 280/655 |
| 4,969,660 | 11/1990 | Spak | 280/646 |
| 5,127,664 | 7/1992 | Cheng | 280/655 |

Primary Examiner—Richard M. Camby
Attorney, Agent, or Firm—Brown, Martin, Haller & McClain

[57] ABSTRACT

A collapsible cart for carrying luggage or the like has two legs pivoted together at one end for movement between a collapsed position in which the legs are parallel and an expanded, luggage-carrying position in which the opposite ends of the legs are spaced apart into a generally V-shaped configuration. The legs carry wheels at their free ends. A releasable retainer secures the legs together in the collapsed position, and the legs are biassed apart by a spring into the expanded position when the retainer is released.

12 Claims, 1 Drawing Sheet

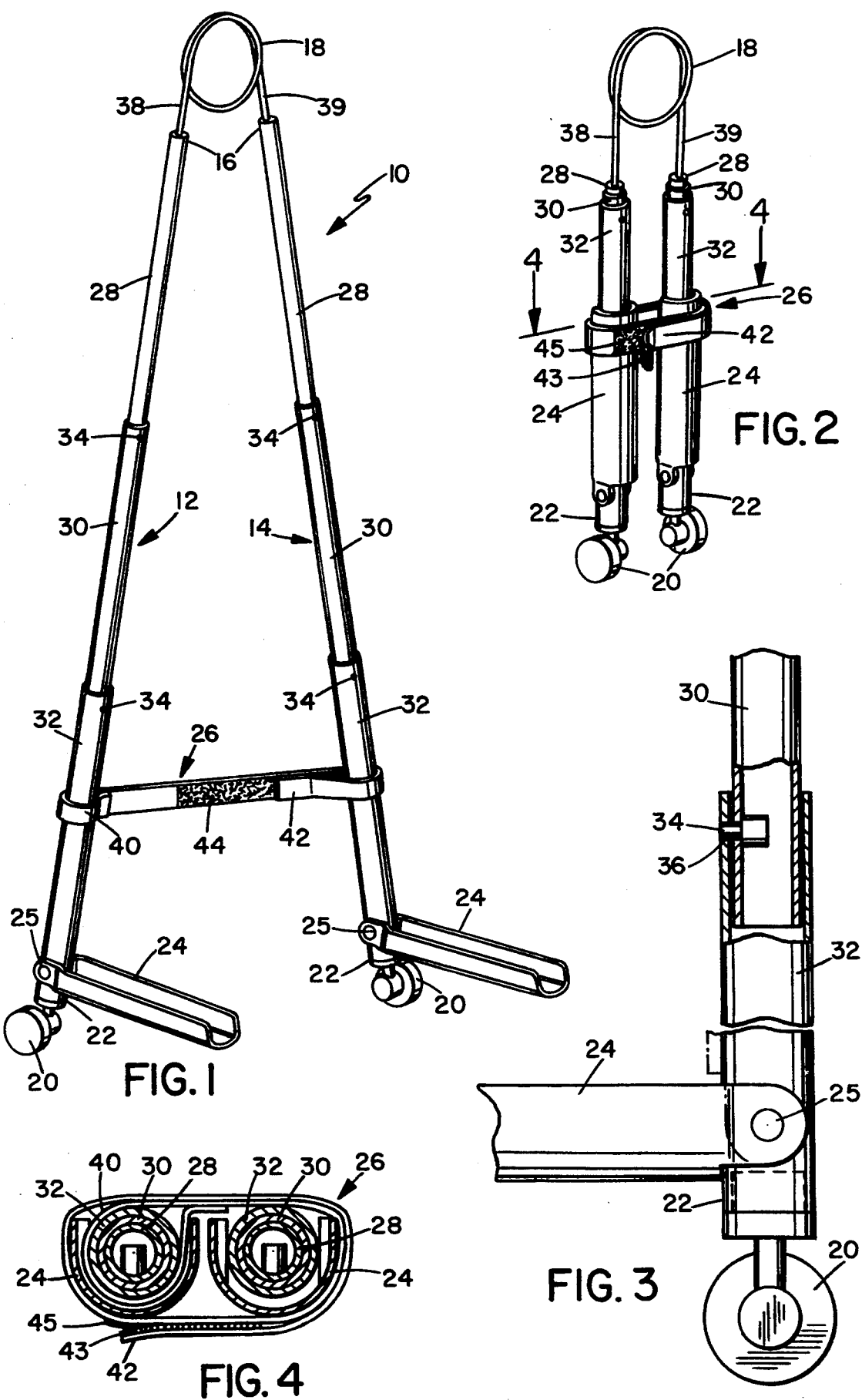

COLLAPSIBLE CART

BACKGROUND OF THE INVENTION

The present invention relates to collapsible carts or trolleys for carrying luggage or the like which are collapsible into a relatively compact configuration for storage or carrying when not in use.

Luggage carts or trolleys for pulling or pushing by hand typically have a wheeled base for supporting luggage and a handle projecting upwardly from the base. These are typically collapsible at least to some extent so that they can be carried while not in use or stowed away in a small space, such as under the seat of an aircraft. U.S. Pat. No. 4,299,403 of Breweriet al., for example, describes a wheeled carrier in which the handle section can be folded downwardly when not in use. However, the cart is still relatively bulky even when collapsed. In U.S. Pat. No. 3,007,710 of Sykes, a collapsible cart has two, telescopically collapsible legs hinged together at one end and having wheels at their opposite, free ends. The free ends of the legs are pulled apart into a divergent configuration when the cart is used, with the spaced legs being held apart by means of a brace when deployed. This is a relatively cumbersome and heavy device.

SUMMARY OF THE INVENTION

It is an object of the present invention to provide a new and improved collapsible cart for carrying luggage or the like.

According to the present invention, a collapsible cart is provided which comprises two elongate legs each comprising a plurality of telescopically interfitting tubular members, the legs being hinged together at their first ends for movement between a collapsed position in which the legs are parallel to one another and an expanded or deployed position in which the legs diverge from one another in a generally V-shaped configuration, the legs carrying wheels at their opposite, second ends, and a spring or other biassing device urging the legs apart into the deployed position. A releasable retaining device holds the legs together in the collapsed position so that the legs are automatically deployed into the expanded position ready for use on release of the retaining device. Suitable load supporting members are attached to the legs for movement between a collapsed position against the respective leg and a deployed position projecting outwardly from the leg to form a support for one or more suitcases or other items to be carried by the cart.

This cart can be collapsed easily into a very compact configuration simply by telescopically collapsing each leg, urging the legs inwardly to their collapsed, parallel position and retaining the legs in that position by means of the retaining device. All that is necessary to expand the cart ready for use is to release the retaining device, which may be a strap or band or the like, so that the legs automatically spring apart ready for use. This is particularly useful in situations where the user may have only one hand free to deploy the cart.

Preferably, the retaining device both retains the legs in the collapsed position, and also limits the maximum expansion of the legs when released, so that they can only be urged apart to a selected, maximum angle relative to one another. In one embodiment of the invention, the retaining device comprises a strap of predetermined length secured to one of the legs and having a free end which is releasably securable to the strap to form a loop around the other leg in order to hold the legs at a desired spacing when expanded. The strap is wrapped around the legs several times when the legs are collapsed and the free end secured to an underlying portion of the wrapped strap to hold the legs in the collapsed condition.

When fully collapsed, the cart will be very small and compact and may be readily stored in a handbag, briefcase or other small carrier, or under a vehicle seat, until needed for use. When needed to carry luggage or other items, the retaining strap is simply released, allowing the legs to spring apart automatically to the maximum length permitted by the loop, so only one operation is needed to deploy the cart.

In a preferred embodiment of the invention, the legs are joined together by a coil spring at their first ends, the spring acting as the hinge permitting separation of the legs, and also acting to bias the legs apart into the deployed configuration. The coil spring preferably also acts as a handle permitting the user to pull or push the cart.

This arrangement provides a very compact, lightweight and easy to use collapsible cart which can be carried easily even in a relatively small bag when not in use, and which is very easy to deploy with a simple action when needed for use.

BRIEF DESCRIPTION OF THE DRAWINGS

This invention will be better understood from the following detailed description of a preferred embodiment of the invention, taken in conjunction with the accompanying drawings, in which like reference numerals refer to like parts, and in which:

FIG. 1 is a perspective view of the luggage dolly according to a preferred embodiment of the invention in fully opened position;

FIG. 2 is a similar view with the luggage dolly in fully collapsed position;

FIG. 3 is an enlarged side elevation view of the lower end of one leg, with portions cut away; and FIG. 4 is an enlarged sectional view taken on line 4—4 of FIG. 2.

DESCRIPTION OF THE PREFERRED EMBODIMENT

The drawings illustrate a collapsible luggage cart or dolly 10 according to a preferred embodiment of the present invention for carrying luggage such as suitcases, briefcases, vanity cases or the like, or other relatively heavy items for easy hand transportation. The cart 10 basically comprises a pair of elongate legs 12,14 which are connected together at their upper or first ends 16 by means of a coil spring 18 which also acts as a handle. The legs 12,14 each have a wheel 20 at their lower or second ends 22. Each leg has a support arm or flap 24 pivotally mounted via pivots 25 at a location adjacent the lower end of the leg, for movement between a retracted position folded up against the leg, as illustrated in FIGS. 2 and 4, and an extended or deployed position folded outwardly to project out from the leg, as illustrated in FIGS. 1 and 3. In the deployed position, arms 24 act as a support for luggage or other items carried on the dolly. Spring 18 acts to bias the legs apart into an inverted V-shaped configuration, as illustrated in FIG. 1. An adjustable retaining strap 26 limits the separation between the legs.

Each leg comprises a series of three telescopically interfitting tubular members 28,30,32 of gradually increasing diameter from the upper end to the lower end of the leg. The two smaller tubular members 28 and 30 can be telescopically collapsed into the largest tubular member 32 in the collapsed position illustrated in FIG. 2. When the tubular members are pulled out to their maximum possible extension, spring-loaded latch buttons 34 adjacent the lower end of the members 28,30 engage in corresponding openings 36 at the upper ends of the members 30 and 32, respectively, as best illustrated in FIG. 3, so as to hold the telescoping members in the fully extended position. The buttons 34 are simply depressed inwardly in order to allow the tubular members to be telescopically collapsed.

The tubular members are of circular cross-section, and the support arms 24 each comprise a channel member forming a channel of rounded cross-section designed to fit closely over the lowermost tubular member 32 when folded inwardly, as illustrated in FIG. 4. This provides a very compact configuration when the assembly is collapsed.

The coil spring 18 which doubles as a handle has at least one turn and the free ends 38,39 of the spring are inserted into the upper ends of the uppermost tubular members 28 of the legs, and suitably secured by welding, screw fasteners or the like. The spring is oriented so that it lies in the plane of the expanded legs with the central axis of the spring perpendicular to the plane of the legs, as illustrated in FIG. 1. This allows the spring to act as a handle which can be conveniently gripped by a user in order to pull or push the trolley.

The restraining strap 26 is permanently secured to one of the legs 12 via loop 40 at one end, and the other end 42 is adjustably secured around the other leg 14 via any suitable adjustable fastener mechanism, such as strips 43,44 of mating, hook-and-loop type fastener material (Velcro ®) secured to the belt end 42 and along part of the length of the belt at a location spaced from belt end 42. Another small patch 45 of hook-and-loop fastener material identical to material 44 is secured on the opposite side of the belt to strip 44.

When the belt end 42 is released, the legs 12 and 14 will spring apart to the maximum possible extent permitted by spring 18. The user can secure the legs at any desired separation up to this maximum by securing belt end 42 to Velcro ® strip 44 at a selected position after passing it around leg 14, as illustrated in FIG. 1. The length of the strip 44 allows a wide range of adjustment of the leg separation. Thus, the spacing between support arms 24 can be adjusted according to the size of an item to be supported and carried on arms 24. Typically, in order to carry an overnight bag or garment bag, the arm spacing will be around 18 inches, while for a smaller bag such as a briefcase a spacing of around 12 inches will be used.

When the dolly 10 is not needed for carrying luggage, other cases, or other relatively heavy items, it can be collapsed quickly and easily from the expanded position illustrated in FIG. 1 into the collapsed position illustrated in FIGS. 2 and 4. The telescoping tubular members 28 and 30 are released and collapsed inwardly into the lowermost tubular member 32 after pushing the legs inwardly until they are more or less parallel to one another. The support arms 24 are folded up and over the leg members 32. In order to retain the arms 24 in their folded position and the legs in a collapsed position parallel to one another against the action of spring 18, strap 26 is wrapped several times around the parallel legs and folded support arms 24, and the free end 42 is then secured via Velcro ® strip 43 to the underlying Velcro ® strip 45 on the outside of the strap, as illustrated in FIGS. 2 and 4. At this point the dolly 10 is in a collapsed, very compact configuration and may be easily carried inside a small bag or briefcase or stored somewhere until it is next needed.

When the cart is needed to carry luggage or other items, the strap end 42 is released, so that the legs spring apart. Arms 24 are folded down and the legs are fully extended. The strap end 42 is secured around leg 14 and engaged with Velcro ® strip 44 to hold the legs at the desired separation. The cart is then ready for use.

This collapsible luggage dolly is of simple and lightweight construction. A spring 18 is used both for the handle and for biasing the legs apart when they are released. The legs themselves are of lightweight metal or plastic tubing, making the dolly easy to carry in a briefcase or the like when collapsed. The dolly is easy to deploy ready for use when needed, simply by releasing the strap 26, folding down arms 24, pulling out the legs to their maximum possible length and securing the legs at the desired spacing with strap 26. A case, bag or other item may then be placed on arms 24 and against the legs 12,14, and may be secured to the legs by additional straps if desired. The dolly is then tilted and pulled or pushed via handle 18 to the desired location.

The dolly or cart is inexpensive and easy to use, and is collapsible into an extremely compact configuration for easy storing and carrying when not needed to carry luggage or other items. It is adjustable in its expanded configuration to vary the spacing between the item support arms 24 according to the dimensions of an item to be carried.

Although a preferred embodiment of the invention has been described above by way of example only, it will be understood by those skilled in the field that modifications may be made to the disclosed embodiment without departing from the scope of the invention, which is defined by the appended claims.

I claim:

1. A collapsible luggage cart, comprising:
   a pair of elongate legs having opposite first and second ends;
   hinge means for securing the legs together at their first ends for movement between a collapsed position in which the legs are parallel to one another and an expanded position in which the legs are spaced apart at their second ends into a generally V-shaped configuration;
   each leg having at least one wheel at its second end;
   retractable support means on each leg for movement between a retracted position against the respective leg and an extended position projecting outwardly from the leg for supporting one or more items to be carried on the cart;
   releasable retaining means for holding said legs in the collapsed position; and
   biasing means for automatically biasing said legs into the expanded position when said retaining means is released.

2. The cart as claimed in claim 1, wherein said hinge means comprises a coil spring extending between the first ends of said legs, said coil spring further comprising said biasing means.

3. The cart as claimed in claim 2, wherein the coil spring is oriented with its central axis extending perpendicular to the plane of said legs, and has a first end secured to the first end of one of the legs and a second end secured to the first end of the other leg.

4. The cart as claimed in claim 2, wherein said coil spring further comprises a handle for gripping by a user in pushing or pulling the cart.

5. The cart as claimed in claim 1, wherein each leg comprises a plurality of telescopically interfitting tubular members moveable between a collapsed position in which the tubular members are telescopically collapsed and an extended position in which the tubular members are fully extended.

6. The cart as claimed in claim 1, further including limit means for limiting the separation of said legs when said retaining means is released.

7. The cart as claimed in claim 1, wherein the retaining means comprises a strap secured to one of the legs and having a free end for wrapping around the legs in their collapsed position, the free end and the strap having releasable securing means for releasably securing the free end of the strap to an underlying portion of the strap when the strap has been wrapped around the collapsed legs.

8. The cart as claimed in claim 7, wherein the strap further comprises adjustable limit means for limiting the separation between the legs to a selected separation, the limit means comprising fastener means for releasably fastening the free end of the strap to the belt to form a loop around the other leg, the loop being adjustable in size to vary the separation between the legs.

9. The cart as claimed in claim 8, wherein the strap has opposite outer and inner faces, the releasable securing means comprising first and second mating strips of hook-and-loop type fastener material on opposite faces of the strap at a location adjacent the free end of the strap and a location spaced from the free end of the strap, and the limit means comprises a third strip of hook-and-loop type fastener material on the same face of the strap as the first strip at the free end of the strap for securing to the first strip to form an adjustable size loop, the third strip being longer than the first and second mating strips.

10. The cart as claimed in claim 1, wherein each support means comprises a support arm having a first end pivotally secured to a respective leg for movement between said retracted and extended positions.

11. The cart as claimed in claim 10, wherein each support arm comprises a channel member having a channel facing inwardly when said arm is retracted, the channel comprising means for engaging over the leg when the arm is folded against the leg.

12. The cart as claimed in claim 1, wherein the legs are tubular.

* * * * *